(12) United States Patent
Cho

(10) Patent No.: US 10,400,796 B2
(45) Date of Patent: Sep. 3, 2019

(54) EJECTOR ASSEMBLY AND VACUUM PUMP

(71) Applicant: VMECA CO., LTD., Seoul (KR)

(72) Inventor: Ho-Young Cho, Seoul (KR)

(73) Assignee: VMECA CO., LTD., Seoul (KR)

( * ) Notice: Subject to any disclaimer, the term of this patent is extended or adjusted under 35 U.S.C. 154(b) by 287 days.

(21) Appl. No.: 15/304,027

(22) PCT Filed: Apr. 15, 2015

(86) PCT No.: PCT/KR2015/003745
§ 371 (c)(1),
(2) Date: Oct. 13, 2016

(87) PCT Pub. No.: WO2015/163630
PCT Pub. Date: Oct. 29, 2015

(65) Prior Publication Data
US 2017/0037874 A1    Feb. 9, 2017

(30) Foreign Application Priority Data

Apr. 24, 2014 (KR) .......................... 10-2014-0049552

(51) Int. Cl.
*F04F 5/20* (2006.01)
*F04F 5/44* (2006.01)
(Continued)

(52) U.S. Cl.
CPC .............. *F04F 5/20* (2013.01); *B25J 15/0675* (2013.01); *F04C 25/02* (2013.01); *F04F 5/14* (2013.01);
(Continued)

(58) Field of Classification Search
CPC ........ F04F 5/16; F04F 5/20; F04F 5/14; F04F 5/42; F04F 5/466; F04F 5/464; F04F 5/44; B25J 15/0675
(Continued)

(56) References Cited

U.S. PATENT DOCUMENTS 1,804,569 A * 5/1931 Taddiken ................ F04F 5/466
                                                                    417/176
4,597,716 A    7/1986 Evenson
(Continued)

FOREIGN PATENT DOCUMENTS

KR    100393434    7/2003
KR    100578540    5/2006
(Continued)

OTHER PUBLICATIONS

International Search Report & Written Opinion from corresponding International PCT Application No. PCT/KR2015/003745, 11 pages.

*Primary Examiner* — Christopher S Bobish
(74) *Attorney, Agent, or Firm* — Innovation Capital Law Group, LLP; Vic Lin

(57) ABSTRACT

The present invention relates to an ejector assembly and a vacuum pump, the ejector assembly including a typical cylindrical vacuum ejector and a support part. The support part includes a first support having a supply line extending outwards from a hole in which a first end of the ejector is mounted, and a second support having a discharge line extending outwards from a hole in which a second end of the ejector is mounted. Further, the first and second supports facing each other are configured such that the outer circumferential surfaces thereof are in contact with the inner circumferential surface of a pipe member so as to form a space between the first and second supports, the space communicating with through holes. In the vacuum pump using the ejector assembly, the pipe member is a housing, and the space is a vacuum chamber formed in the housing.

12 Claims, 11 Drawing Sheets

(51) Int. Cl.
    *F04F 5/46* (2006.01)
    *F04F 5/42* (2006.01)
    *B25J 15/06* (2006.01)
    *F04C 25/02* (2006.01)
    *F04F 5/14* (2006.01)
    *F04F 5/22* (2006.01)
    *F04F 5/16* (2006.01)

(52) U.S. Cl.
    CPC ............ *F04F 5/16* (2013.01); *F04F 5/22* (2013.01); *F04F 5/42* (2013.01); *F04F 5/44* (2013.01); *F04F 5/46* (2013.01); *F04F 5/464* (2013.01)

(58) Field of Classification Search
    USPC .................................................. 417/176, 179
    See application file for complete search history.

(56) References Cited

U.S. PATENT DOCUMENTS

| | | | |
|---|---|---|---|
| 4,861,232 A | 8/1989 | Ise et al. | |
| 5,032,260 A | 7/1991 | Alzner | |
| 5,205,717 A | 4/1993 | Tell | |
| 5,228,839 A | 7/1993 | Peterson et al. | |
| 5,623,870 A | 4/1997 | Daniel | |
| 5,624,239 A | 4/1997 | Osika | |
| 6,017,195 A * | 1/2000 | Skaggs | F04F 5/466 417/181 |
| 6,155,796 A | 12/2000 | Schmalz et al. | |
| 6,394,760 B1 | 5/2002 | Tell | |
| 6,416,295 B1 * | 7/2002 | Nagai | F04F 5/44 417/187 |
| 6,561,769 B1 | 5/2003 | Tell | |
| 6,588,580 B2 | 7/2003 | Janzen | |
| 6,682,313 B1 | 1/2004 | Sulmone | |
| 6,764,526 B2 | 7/2004 | Freytag et al. | |
| 7,909,903 B2 | 3/2011 | Cho | |
| 8,231,358 B2 * | 7/2012 | Cho | F04F 5/22 417/163 |
| 8,267,367 B2 * | 9/2012 | Cho | B25B 11/007 248/363 |
| 9,927,039 B2 * | 3/2018 | Cho | F16K 15/148 |
| 2007/0148009 A1 * | 6/2007 | Cho | F04F 5/467 417/174 |
| 2010/0244344 A1 * | 9/2010 | Mougin | B25J 15/0052 269/21 |

FOREIGN PATENT DOCUMENTS

| | | |
|---|---|---|
| KR | 100629994 | 9/2006 |
| KR | 100865932 B1 | 10/2008 |
| KR | 101251825 B1 | 4/2013 |
| KR | 101351768 B1 | 1/2014 |
| WO | 0050776 A1 | 8/2000 |

* cited by examiner

Prior Art

EJECTOR ASSEMBLY AND VACUUM PUMP

TECHNICAL FIELD

The present invention relates generally to a vacuum pump utilized in a vacuum transfer system. More particularly, the present invention relates to an ejector as an important component of the vacuum pump.

BACKGROUND ART

In general, a vacuum transfer system is a system in which an object is grabbed by negative pressure generated in such a way that a vacuum pump is operated by compressed air with highly rapid speed and thus inside air of a suction cup or pad is sucked, so as to transfer the object to a predetermined location. The present invention relates to a vacuum pump of the vacuum transfer system. More particularly, the present invention relates to an ejector as an important component of the vacuum pump.

An example of a conventional ejector and a vacuum pump are disclosed in Korean Utility Model Registration No. 274370. Referring to FIG. 1, this vacuum pump 1 includes: a housing 2 having an inlet chamber C1, a vacuum chamber C2, and a discharge chamber C3; and an ejector 3 having a plurality of nozzles 4a, 4b, and 4c mounted on partition walls W between the chambers C1, C2, and C3. Usually, the plurality of nozzles 4a, 4b, and 4c are multi-stage nozzles disposed in series.

A vacuum transfer system is configured such that the vacuum pump 1 is fixed to a structure by using a bracket supporting the housing 2, and is configured to include a suction cup 5 connected to the vacuum chamber C2 so as to communicate with an inside of the ejector 3, and a robot arm connected to the suction cup 5.

In the vacuum transfer system, compressed air is supplied to the inlet chamber C1, rapidly passes through the plurality of nozzles 4a, 4b, and 4c of the ejector 3 in sequence, and is discharged outwards via the discharge chamber C3. At this time, inside air of the suction cup 5 is introduced into the ejector 3 so as to be discharged with the compressed air. In this discharge process, a vacuum and negative pressure are generated in inner space of the suction cup 5, and an object is grabbed by the negative pressure so as to be transferred to a predetermined location.

Although this type of vacuum pump 1 is utilized in the field at present, it is problematic in that the ejector 3 cannot be individually utilized. That is, the housing 2 requires a frame and partition walls W so as to install the nozzles 4a, 4b, and 4c in the housing 2, and by means of this, the ejector 3 may be installed.

To overcome this problem, a vacuum ejector pump is disclosed in Korean Patents Nos. 393434 (the same as U.S. Pat. No. 6,394,760), 578540, and 629994. FIG. 2 illustrates a vacuum pump 6 disclosed in Korean Patent No. 393434. In the vacuum pump 6, an individually structured cartridge-type cylindrical ejector 8 is disclosed. Further, the ejector 8 is detachably provided in the housing 7.

Although the ejector 8 is individually and detachably provided, however, in the same manner as FIG. 1, the housing 7 also requires inlet, vacuum, and discharge chambers C1, C2, and C3, and partition walls W between the chambers C1, C2, and C3 so as to install the ejector 8. Furthermore, the above-described components of the housing 7 should be accurately designed according to characteristics of the ejector 8.

Accordingly, it is problematic in that the ejector 8 is ineffective in being mounted and utilized. Furthermore, it is also problematic in that the ejector 8 is ineffective in assembling and manufacturing the entire vacuum pump 6 including the housing 7.

DISCLOSURE

Technical Problem

Accordingly, the present invention has been made keeping in mind the above problems occurring in the related art, and the present invention is intended to provide: first, an ejector assembly capable of being improved in applicability; and second, an ejector assembly and a vacuum pump capable of being simply assembled and disassembled.

Technical Solution

In order to accomplish the above object, the present invention provides an ejector assembly including: a cylindrical vacuum ejector including: a supply hole formed in a first end of the ejector; a discharge hole formed in a second end of the ejector; and through holes formed on a side surface of the ejector; and a support part including: a first support having a supply line extending outwards from a hole in which the first end of the ejector is mounted; and a second support having a discharge line extending outwards from a hole in which the second end of the ejector is mounted, in which the support part is configured such that outer circumferential surfaces of the first and second supports facing each other are in contact with an inner circumferential surface of a cylindrical pipe member so that a space communicating with the through holes is formed between the first and second supports.

Extended distal ends of the supply and discharge lines may be formed on the outer circumferential surfaces of the first and second supports, respectively. The first support may further include a release line extending from the outer circumferential surface of the first support to the space.

The first and second supports may include the ring-shaped protrusion formed in a direction opposite to the hole and a ring-shaped protrusion formed in a direction opposite to the hole, respectively. The first and second supports may include the body having the hole and a body having the hole, the ring-shaped protrusion closely disposed on the outside of the body and a ring-shaped protrusion closely disposed on an outside of the body, and coupling members, respectively, the coupling members coupling the bodies and the ring-shaped protrusions to each other, respectively.

Particularly, the coupling members may be U-shaped clips having opposite ends extending toward outer circumferential surfaces of the body and the ring-shaped protrusion, and the body and the ring-shaped protrusion, respectively, and the opposite ends of the U-shaped clips may be inserted into grooves formed on the outer circumferential surfaces of the first and second supports such that upper surfaces of the U-shaped clips are prevented from protruding outside the outer circumferential surfaces of the first and second supports.

Furthermore, the first support (120) includes: a body (123) having the hole (121); a ring-shaped protrusion (124) closely coupled to an outside of the body such that an inner circumference of the ring-shaped protrusion is utilized as a suction port (128) communicating with the space (V) via paths (127) formed in the body (123); and a release line (126b) extending from the outer circumferential surface of the first support to the suction port (128), the release line (126b) being inclined toward a second end of an air filter (129) disposed between the suction port (128) and the paths (127).

A vacuum pump of the present invention includes: the ejector assembly; a housing as a pipe member surrounding the ejector assembly, the housing including: an inlet port communicating with the supply hole; a discharge port communicating with the discharge hole; and side suction ports communicating with both a vacuum chamber as the space and the through holes; and a coupling means coupling the ejector assembly and the housing to each other.

The housing may be configured such that two or more parts including a main part having the side suction ports are closely disposed in a line, and a plurality of mutual locking means is formed on respective contact surfaces between the main part and adjacent parts so as to allow a rotation of the main part relative to the adjacent parts and thus allow a change in a direction of the side suction ports of the main part.

Advantageous Effects

According to the present invention, an ejector assembly installed in a cylindrical pipe member can form a closed space, that is, a vacuum chamber. Accordingly, a vacuum pump may be structured by simply utilizing the ejector assembly in the pipe member without using a specific housing designed for an ejector. Although the ejector assembly according to an embodiment of the present invention includes a plurality of components, the components can be simply assembled or disassembled without using a specific tool.

Meanwhile, the vacuum pump according to the present invention includes the ejector assembly and a housing surrounding the ejector assembly. The housing may be separated into a plurality of parts as desired, and a rotation of a main part with a suction port may be allowed so as to change in a direction of the main part. Thus, applicability in the field can be greatly improved. In this case, the parts of the housing may also be simply assembled or disassembled.

[Description of Reference Symbols]

Figure 1:
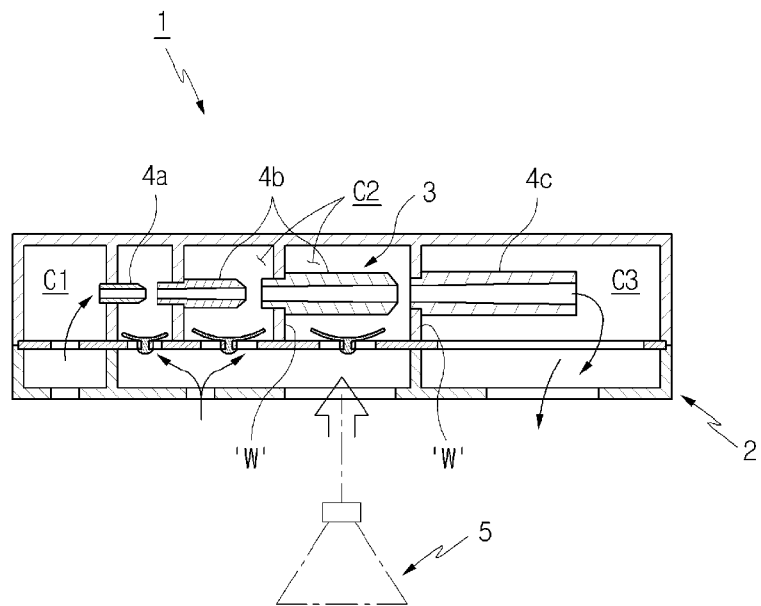
FIG. 1 is a sectional view of a vacuum pump according to the related art.
Figure 2:
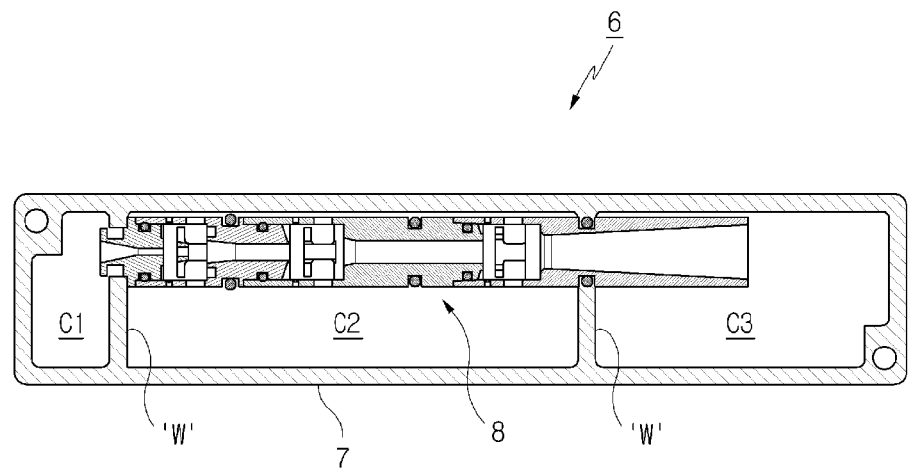
FIG. 2 is a sectional view of a vacuum ejector according to the related art.
Figure 3:
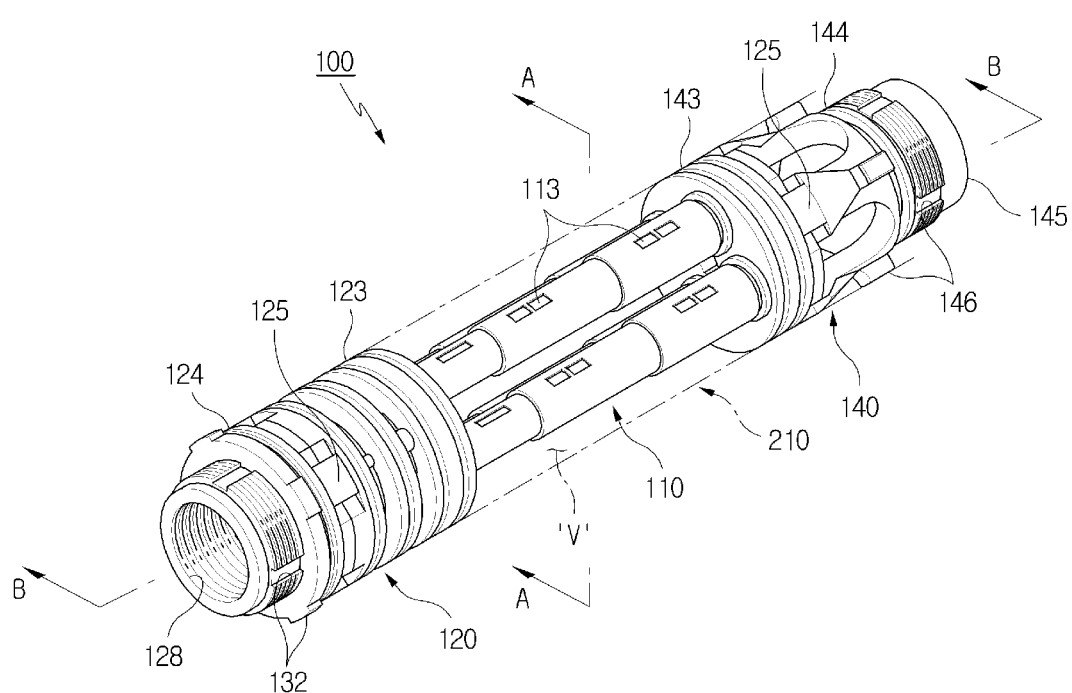
FIG. 3 is a perspective view of an ejector assembly according to the present invention.
Figure 4:
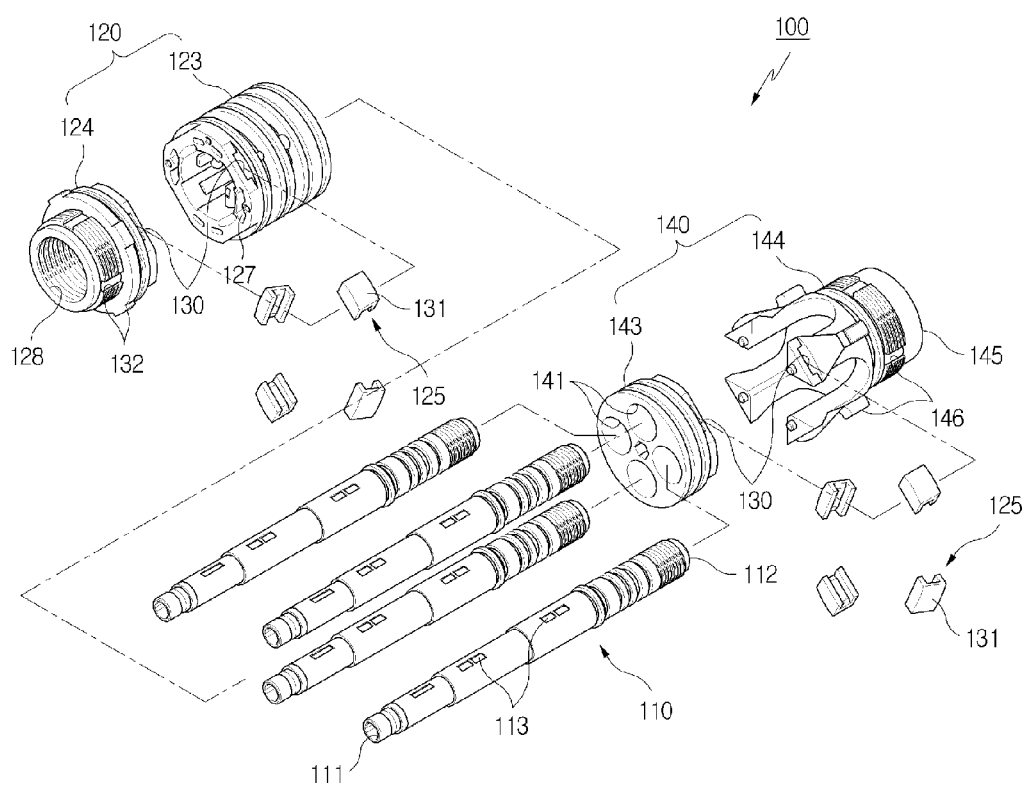
FIG. 4 is an exploded view of FIG. 3.
Figure 5:
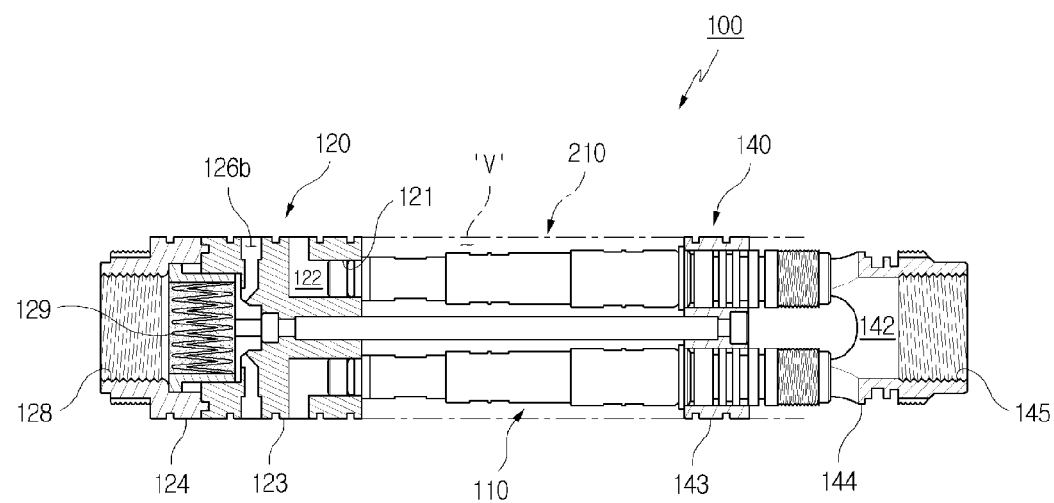
FIG. 5 is a sectional view taken along line A-A of FIG. 3.
Figure 6:
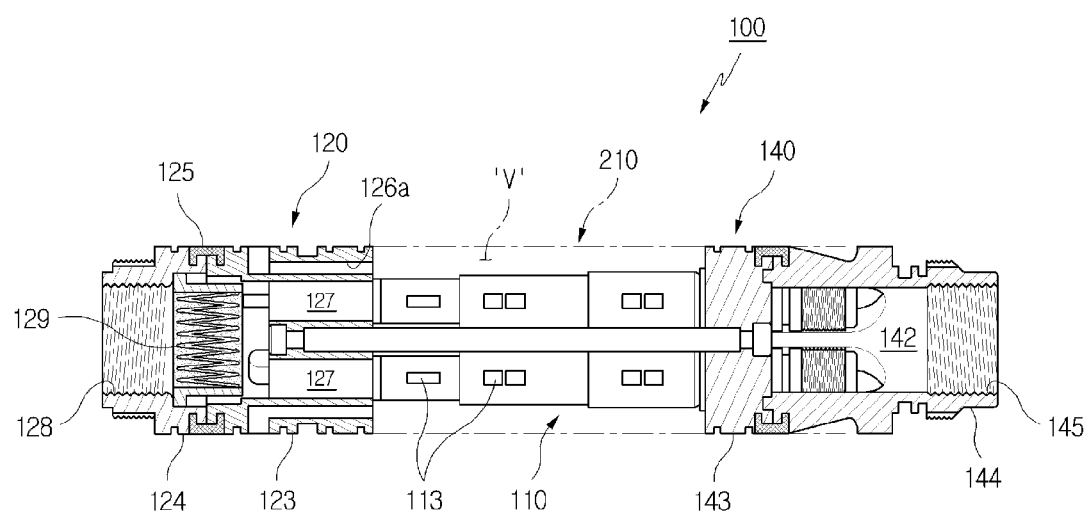
FIG. 6 is a sectional view taken along line B-B of FIG. 3.
Figure 7:
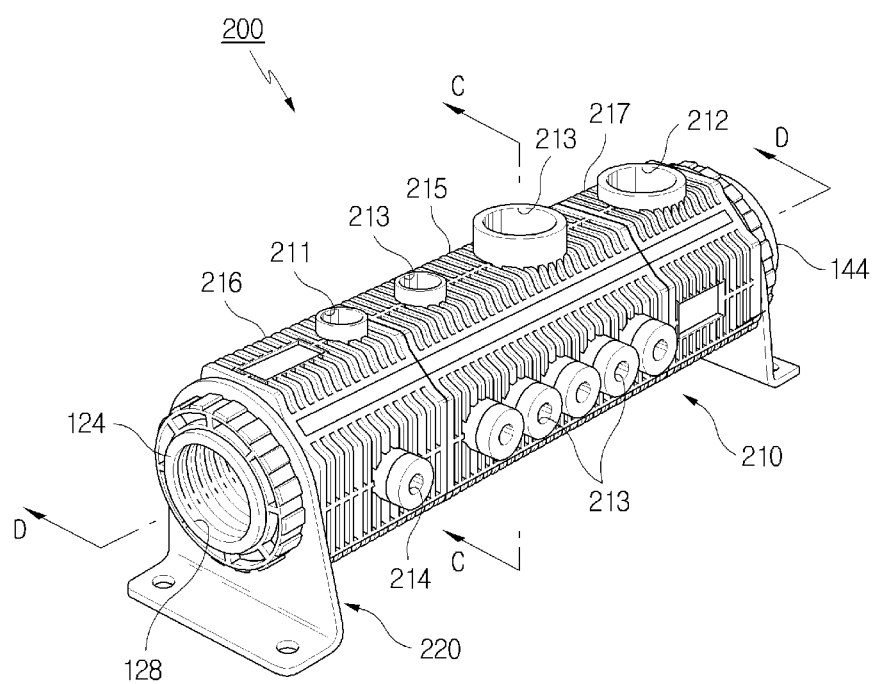
FIG. 7 is a perspective view of a vacuum pump according to the present invention.
Figure 8:
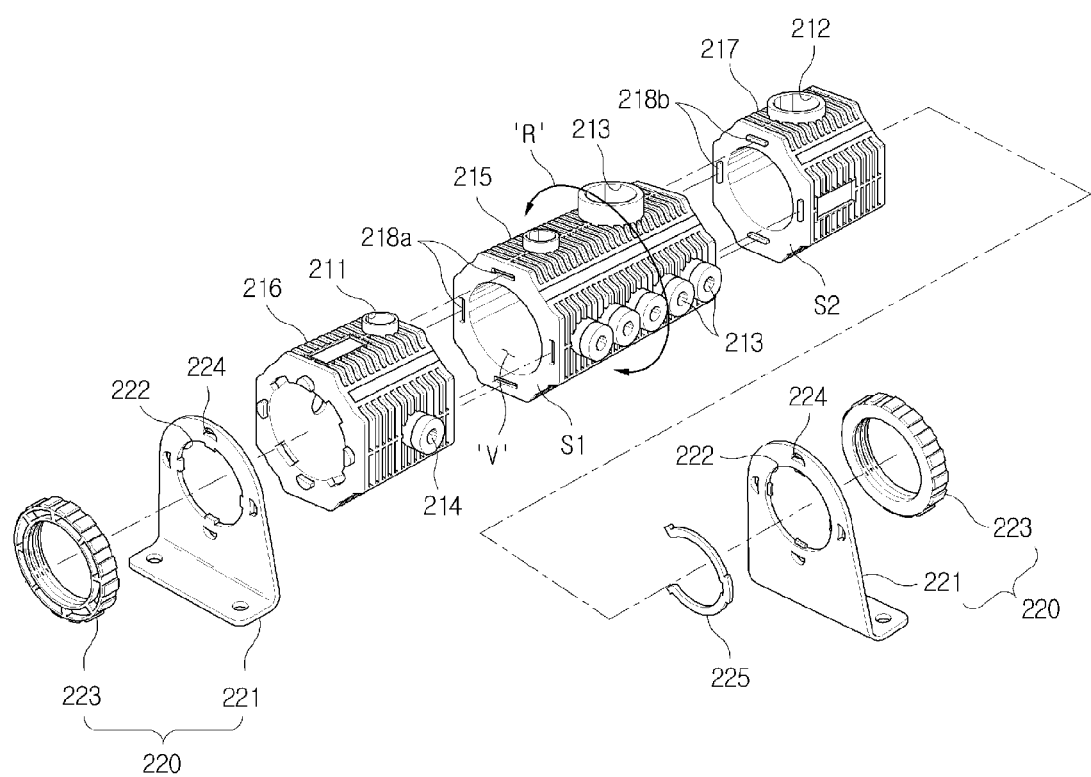
FIG. 8 is an exploded view of a housing in FIG. 7.
Figure 9:
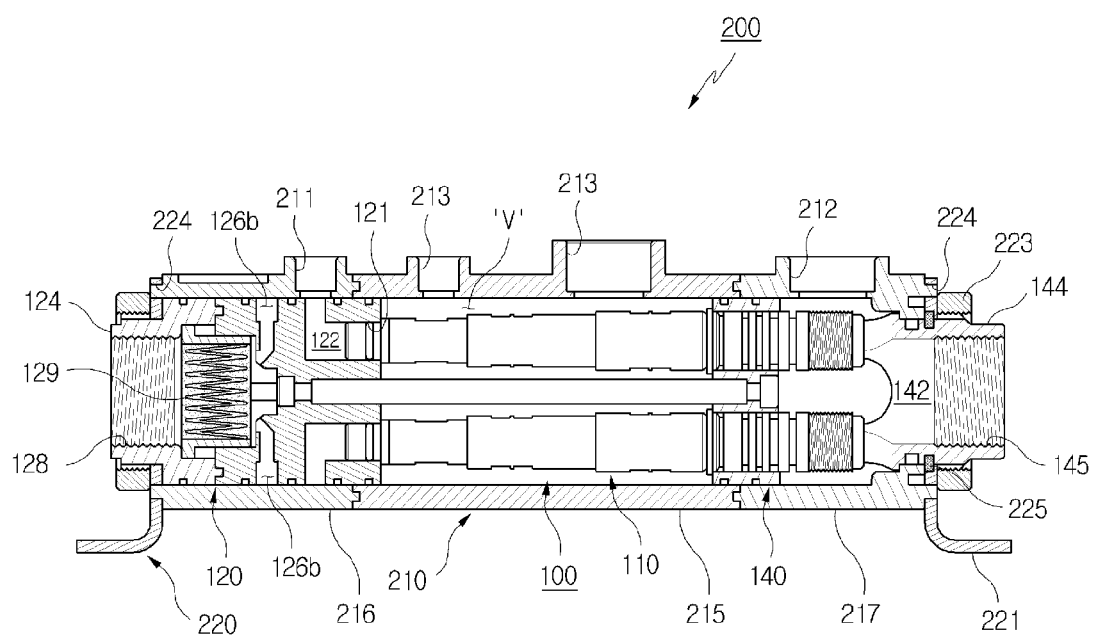
FIG. 9 is a sectional view taken along line C-C of FIG. 7.
Figure 10:
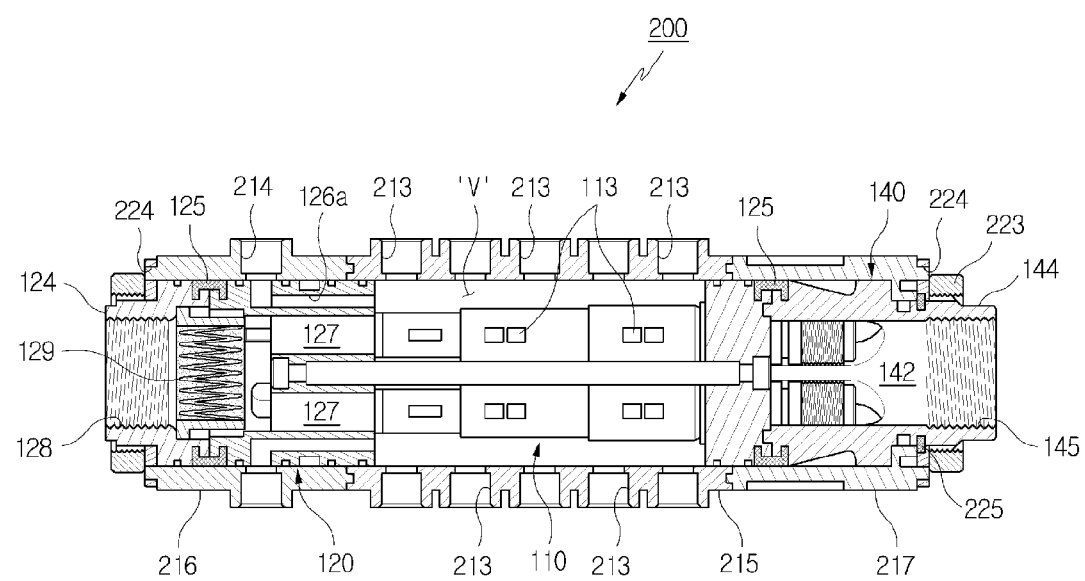
FIG. 10 is a sectional view taken along line D-D of FIG. 7.

| | | | |
|---|---|---|---|
| 100. | ejector assembly | | |
| 110. | ejector | 111. | supply hole |
| 112. | discharge hole | 113. | through hole |
| 120. | first support | 121. | hole |
| 122. | supply line | 123. | body |
| 124. | ring-shaped protrusion | 125. | coupling member |
| 126a and 126b. | release line | 127. | path |
| 128. | suction port | 129. | filter |
| 130. | groove | 131. | upper surface |
| 140. | second support | 141. | hole |
| 142. | discharge line | 143. | body |
| 144. | ring-shaped protrusion | 145. | discharge port |
| 200. | vacuum pump | | |
| 210. | pipe member, housing | | |
| 211. | inlet port | 212. | discharge port |
| 213. | suction port | 214. | release port |
| 215. | main part | | |
| 216 and 217. | adjacent part | | |
| 218a and 218b. | locking means | 220. | coupling means |
| 221. | plate | 222. | hole |
| 223. | pressure ring | 224. | insertion hole |
| 225. | snap ring | | |
| S1 and S2. | contact surface | | |
| V. | space, vacuum chamber | | |

BEST MODE

The omitted or above-described features and effects of an ejector assembly (hereinafter referred to simply as 'assembly') and a vacuum pump according to the present invention will be described in detail with exemplary embodiments along with the accompanying drawings of the present invention. In FIGS. 3 to 12, reference symbol 100 is assigned to the assembly of the present invention, and reference symbol 200 is assigned to the vacuum pump of the present invention.

Referring to FIGS. 3 to 6, the assembly 100 of the present invention includes a cylindrical vacuum ejector 110 and a support part 120 and 140 in which opposite ends of the ejector 110 are mounted.

The ejector 110 of the present invention is a general vacuum ejector including a supply hole 111 formed in a first end of the ejector 110, a discharge hole 112 formed in a second end of the ejector 110, and through holes 113 formed on a side surface of the ejector 110. As desired, the ejector 110 may include multi-stage nozzles disposed in series, and other forms and structures of the ejector 110 may also be possible. In this regard, any ejector may be applied to the present invention without limitation as long as the ejector includes the holes 111, 112, and 113.

The support part includes first and second supports 120 and 140. The first and second supports 120 and 140 face each other, and are disposed on the opposite ends of the ejector 110, respectively. The support part is configured such that when the assembly of the present invention is installed in a cylindrical pipe member 210, the outer circumferential surfaces of the first and second supports 120 and 140 are in contact with the inner circumferential surface of the pipe member 210 so that a space V communicating with the through holes 113 of the ejector 110 is formed between the first and second supports 120 and 140.

Here, compared to having an angular shape, it is highly effective that the pipe member 210 is formed in a cylindrical shape, and the outer circumferential surfaces of the first and second supports 120 and 140 are formed in a circular shape making contact with the inner circumferential surface of the pipe member 210, so as to easily manufacture and assemble the pipe member 210 and the first and second supports 120 and 140, and to maintain airtightness of the space V. Further, the pipe member 210 and the space V are a housing 200 and a vacuum chamber according to the vacuum pump (shown in FIG. 9) of the present invention, respectively.

Here, the first support 120 includes a supply line 122 extending outwards from a hole 121 in which the first end of the ejector 110 is mounted, and the second support 140 includes a discharge line 142 extending outwards from a hole 141 in which the second end of the ejector 110 is mounted. Furthermore, the first support 120 further includes a release line 126a extending from the outer circumferential surface of the first support 120 to the space V.

In the embodiment, extended distal ends of the supply and discharge lines 122 and 142 are formed on the outer circumferential surfaces of the first and second supports 120 and 140, respectively. In this case, since directions of the supply and discharge lines 122 and 142 are approximately perpendicular to directions of the holes 121 and 141 and the ejector 120, various designs may be possible by using the first and second supports 120 and 140. Meanwhile, the supply and discharge lines 122 and 142 may be collinear with the ejector 110 by penetrating the holes 121 and 141.

The first and second supports 120 and 140 include the ring-shaped protrusion 124 formed in a direction opposite to the hole 121 and a ring-shaped protrusion 144 formed in a direction opposite to the hole 141, respectively. Preferably, the first and second supports 120 and 140 include the body 123 having the hole 121 and a body 143 having the hole 141, and the ring-shaped protrusion 124 closely disposed on the outside of the body 123 and a ring-shaped protrusion 144 closely disposed on the outside of the body 143, respectively. Further, coupling members 125 couple the bodies 123 and 143 and the ring-shaped protrusions 124 and 144 to each other, respectively. The above-described form and structure of the first and second supports 120 and 140 are advantageous as follows. First, the assembly 100 may be easily mounted on and fixed to the pipe member 210; second, in this case, the assembly 100 may be easily assembled and disassembled; and third, air lines 122, 126a, 126b, 142, and 145, and paths 127 are may be easily designed and formed by using the first and second supports 120 and 140.

The first support 120 is configured such that an inner circumference of the ring-shaped protrusion 124 is utilized as a suction port 128. For this purpose, the paths 127 are formed in the body 123 such that the suction port 128 communicates with the space V via the paths 127. Reference symbol 129 is assigned to an air filter disposed between the suction port 128 and the paths 127.

In the embodiment, the first support 120 further includes a release line 126b extending from the outer circumferential surface of the first support 120 to the suction port 128. As shown, the air filter 129 for filtering sucked air is installed in the suction port 128 of the ring-shaped protrusion 124. In this case, since the release line 126b is formed in a state of being inclined toward a second end of the air filter 129, speed and pressure of compressed air supplied to the release line 116b may be prevented from being reduced.

The second support 140 is configured such that an inner circumference of the ring-shaped protrusion 144 is utilized as a discharge port 145. That is, compressed air passing the ejector 110 may be discharged outwards via the discharge line 142 and the discharge port 145.

The coupling members 125 are U-shaped clips having opposite ends extending toward the outer circumferential surfaces of the body 123 and the ring-shaped protrusion 124, and the body 143 and the ring-shaped protrusion 144, respectively. More particularly, the opposite ends of the U-shaped clips 125 are fully inserted into grooves 130 formed on the outer circumferential surfaces of the body 123 and the ring-shaped protrusion 124, and the body 143 and the ring-shaped protrusion 144, respectively. Thus, the U-shaped clips 125 are configured such that upper surfaces 131 of the U-shaped clips 125 are prevented from protruding outside the outer circumferential surfaces of the body 123 and the ring-shaped protrusion 124, and the body 143 and the ring-shaped protrusion 144. Further, this configuration is advantageous to form the space V by using the first and second supports 120 and 140. Preferably, it is desirable that the extent of curves in the upper surfaces 131 of the U-shaped clips 125 are the same as the extent of curves in the outer circumferential surfaces of the first and second supports 120 and 140, respectively.

A vacuum pump 200 is constituted in such a way that the above-described assembly 100 of the present invention is installed in the housing 210 shown in FIGS. 7 to 12 as the pipe member. Reference symbols 132 and 146 are keys and key grooves formed in each of the first and second supports 120 and 140 such that the keys and key grooves prevent the assembly 100 from randomly rotating when the assembly 100 is coupled to another structure.

Referring to FIGS. 7 to 10, the pump 200 of the present invention includes the assembly 100, the housing 210 surrounding the assembly 100, and coupling means 220 coupling the assembly 100 and the housing 210 to each other.

As described, the assembly of the present invention is installed in the pipe member 210. In this case, the outer circumferential surfaces of the first and second supports 120 and 140 are in contact with the inner circumferential surface of the pipe member 210 so that the space V communicating with the through holes 113 of the ejector 110 is formed between the first and second supports 120 and 140. Further, the pipe member 210 is the housing of the pump 200 of the present invention, and the space V is the vacuum chamber.

The housing 210 as the pipe member surrounding the assembly 100 includes an inlet port 211 communicating with the supply line 122, a discharge port 212 communicating with the discharge line 142, and side suction ports 213 communicating with the vacuum chamber V and the through holes 113. Preferably, the housing 210 further includes a release port 214 communicating with the release lines 126a and 126b.

In the embodiment, the housing 210 is configured such that two or more cylindrical parts 215, 216, and 217 including the main part 215 having the suction ports 213 are closely disposed in a line. Further, a plurality of mutual locking means 218a and 218b is formed on respective contact surfaces S1 and S2 between the main part 215 and the adjacent parts 216 and 217 so as to allow a rotation of the main part 215 relative to the adjacent parts 216 and 217 and thus allow a change in a direction of the suction ports 213 of the main part 215.

In a practical vacuum transfer system, a plurality of flexible hoses connecting the suction ports 213 and suction cups to each other may be provided from the housing 210. In this case, the hoses may be frequently tangled depending on directions of the suction ports 213, the suction cups, or objects. Thus, the structure, in which a direction of the suction ports 213 may be selected as desired, is highly effective.

Specifically, the three parts 215, 216, and 217 including the main part 215 disposed in the middle of the housing, and the adjacent parts 216 and 217 disposed in the respective opposite ends of the housing constitute the single housing 210. Meanwhile, two, or four or more parts may also constitute the housing 210. Further, a length of the housing 210 may vary as desired, for example, depending on a length of the assembly 100, by providing a plurality of short parts.

In the drawings, the inlet, discharge, and suction ports 211, 212, and 213 are formed in the first adjacent, second adjacent, and main parts 216, 217, and 215, respectively, but the positions and the number of the ports 211, 212, and 213 are not limited thereto. Each of the parts 215, 216, and 217 may have two or more ports 211, 212, and 213. Furthermore, although concavo-convex type structures as the plurality of mutual locking means 218a and 218b are illustrated, a rotary sawtooth type structure may be utilized, and other various structures may also be possible as desired.

The positions and the number of mutual locking means 218a and 218b are related to an outer shape of the main part 215. As shown in the drawings, when the outer shape of the main part 215 is an approximately quadrangular shape, the number of mutual locking means formed on each of the contact surfaces S1 and S2 is four. Each of the mutual locking means has the same shape. Accordingly, a rotation of the main part 215 relative to the adjacent parts 216 and 217 may be allowed (with reference to 'R' of FIG. 8), and the main part 215 may be connected to the adjacent parts 216 and 217 by selecting a direction of the main part 215. For example, as shown in the drawings, a direction of the suction ports 213 may be selected among four directions of the suction ports 213 as desired.

The coupling means 220 bring the parts 215, 216, and 217 of the housing 210 into close contact with each other, and couple the assembly 100 and the housing 210 to each other. For this purpose, a snap ring 225 or nut fitted over an outer circumference of the ring-shaped protrusion 144 of the assembly 100 protruding outside an end of the housing 210 is sufficient. However, in the embodiment, the coupling means 220 using plates 221 are disclosed.

Specifically, the coupling means 220 include the plates 221 making contact with the opposite ends of the housing 210, respectively, and pressure rings 223 pressing the plates 221 and the parts 215, 216, and 217 by being fitted over the ring-shaped protrusions 124 and 144 of the assembly 100 passing through mounting holes 222 of the plates 221, respectively, so as to bring the plates 221 and the parts 215, 216, and 217 into close contact with each other.

Reference symbol 224 is assigned to insertion holes or insertion grooves corresponding to protrusions of the adjacent parts 216 and 217 such that the insertion holes or insertion grooves are formed on the plates 241 so as to securely fix the housing 210. The insertion holes 224 are formed along outer circumferences of the mounting holes 222, and thus rotations of the adjacent parts 216 and 217 relative to the plates 221 may be allowed so as to change directions of the adjacent parts 216 and 217. By means of this structure, directions of the inlet and discharge ports 211 and 212 of the housing 210 may also be changed.

Preferably, the plates 221 are utilized as brackets for fixing the pump 200, and the pressure rings 223 are nuts fitted over outer circumferences of the ring-shaped protrusions 124 and 144.

The above-described pump 200 of the present invention constitutes a vacuum transfer system by including a compressed air supplier selectively connected to the inlet port 211 and the release port 214 through an electronic valve, suction cups connected to the suction ports 213 by using long hoses, and robot arms connected to the suction cups. Furthermore, the pump 200 generates or releases a vacuum and negative pressure depending on a direction of the supplied compressed air.

Figure 11:
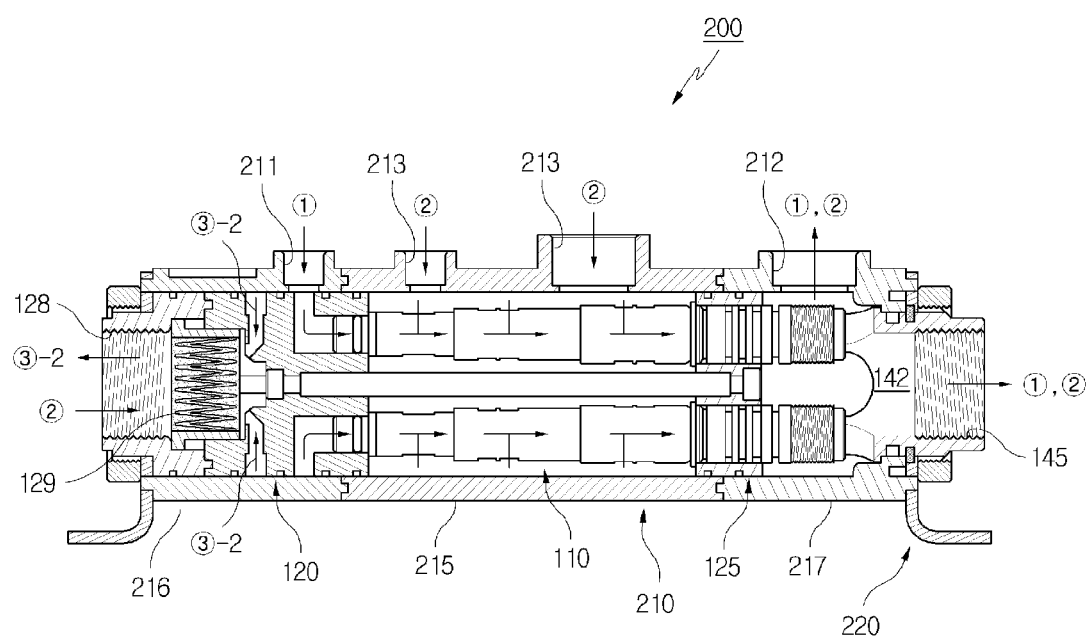
FIGS. 11 and 12 are views corresponding to FIGS. 9 and 10 and illustrating operation of the vacuum pump according to the present invention, respectively.
Figure 12:
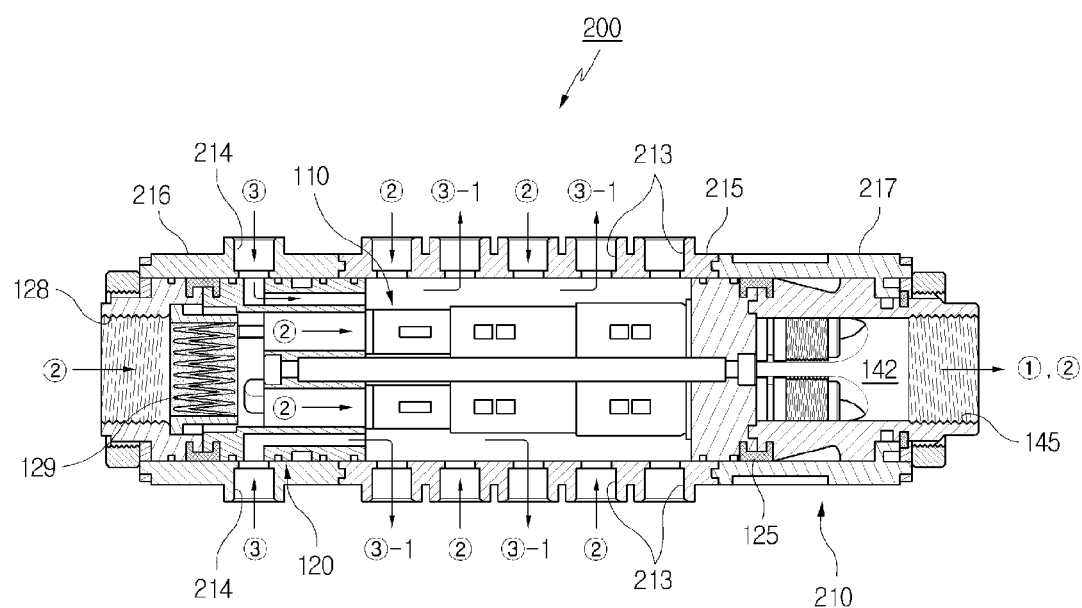

Referring to FIGS. 11 and 12, compressed air is supplied to the inlet port 211, and the compressed air rapidly passes through the supply and discharge lines 122 and 142. Further, the compressed air is discharged outwards via the discharge ports 212 and 145 (with reference to arrow ①). At this time, internal air of the suction cups is introduced into the ejector 110 via the suction ports 213 and 128, the vacuum chamber V, and the through holes 113 in sequence, and the internal air along with the compressed air is discharged outwards (with reference to arrow ②).

In this process, a vacuum and negative pressure are generated in the vacuum chamber V and the suction cups, and objects are grabbed by using the negative pressure. Further, robot arms are operated to transfer the objects to predetermined locations. In this case, hoses connecting the suction ports 213 and the suction cups to each other may be bent, twisted, and tangled depending on locations of the suction ports 213, the suction cups, or objects. Accordingly, the pressure rings 223 are slightly loosened, and directions of the suction ports 213 may be changed by rotating the separated main part 215. Further, depending on the mutual locking means 218a and 218b, directions of the suction ports 213 may be changed by forcibly rotating the main part 215 without loosening the pressure rings 223.

Thereafter, when transfer of the objects is completed, compressed air is supplied to the release port 214 so as to promptly separate the suction cups from the objects. The compressed air supplied to the release port 214 (with reference to arrow ③) passes through the release lines 126a and 126b, and is supplied to the suction ports 213 via the vacuum chamber V (with reference to arrow ③-1), or is directly supplied to the suction port 128 (with reference to arrow ③-2). Thus, the vacuum and the negative pressure are released, and the suction cups are separated from the objects.

Especially, the compressed air passing through the release line 126a collides with and passes through the second end of the air filter 129. Thus, foreign substances gathered on a surface of the air filter 129 are removed.

The invention claimed is:

1. An ejector assembly, comprising: a cylindrical vacuum ejector (110) including:
   a supply hole (111) formed in a first end of the ejector (110); a discharge hole (112) formed in a second end of the ejector (110); and through holes (113) formed on a side surface of the ejector (110); and a support part including:
   a first support (120) having a supply line (122) extending outwards from a first support hole (121) in which the first end of the ejector (110) is mounted; and
   a second support (140) having a discharge line (142) extending outwards from a second support hole (141) in which the second end of the ejector (110) is mounted, wherein
   the support part is configured such that outer circumferential surfaces of the first and second supports (120 and 140) are in contact with an inner circumferential surface of a cylindrical pipe member (210) so that a space (V) communicating with the through holes (113) is formed between the first and second supports (120 and 140), and
   the first support (120) includes:
   a first body (123) having the first support hole (121); a first ring-shaped protrusion (124) closely coupled to an outside of the first body (123) such that an inner circumference of the first ring-shaped protrusion (124) is utilized as a suction port (128) communicating with the space (V) via paths (127) formed in the first body (123); and a release line (126b) extending from the outer circumferential surface of the first support (120) to the suction port (128), the release line (126b) being inclined toward an end of an air filter (129) disposed between the suction port (128) and the paths (127).

2. The ejector assembly of claim 1, wherein extended distal ends of the supply and discharge lines (122 and 142) are formed on the outer circumferential surfaces of the first and second supports (120 and 140), respectively.

3. The ejector assembly of claim 1, wherein the first support (120) further includes a second release line (126a) extending from an outer circumferential surface of the first support (120) to the space (V).

4. The ejector assembly of claim 1, wherein the first and second supports (120 and 140) include the first ring-shaped protrusion (124) extending outward from an outer circumferential surface of the first support (120) and a second ring-shaped protrusion (144) extending outward from an outer circumferential surface of the second support (140).

5. The ejector assembly of claim 1, wherein the first and second supports (120 and 140) include the first body (123) having the first support hole (121) and a second body (143) having the second support hole (141), the first ring-shaped protrusion (124) closely disposed on the outside of the first body (123) and a second ring-shaped protrusion (144) closely disposed on an outside of the second body (143), and coupling members (125), respectively, the coupling members (125) coupling the first and second bodies (123 and 143) and the first and second ring-shaped protrusions (124 and 144) to each other, respectively.

6. The ejector assembly of claim 5, wherein the coupling members (125) are U-shaped clips having opposite ends extending toward outer circumferential surfaces of the first body (123) and the first ring-shaped protrusion (124), and the second body (143) and the second ring-shaped protrusion (144), respectively, and the opposite ends of the U-shaped clips are inserted into grooves (130) formed on the outer circumferential surfaces of the first and second supports (120 and 140) such that upper surfaces (131) of the U-shaped clips are prevented from protruding outside the outer circumferential surfaces of the first and second supports (120 and 140).

7. A vacuum pump, comprising: the ejector assembly (100) of claim 1;

a housing (210) as a pipe member surrounding the ejector assembly (100), the housing (210) including:

an inlet port (211) communicating with the supply hole (111); a discharge port (212) communicating with the discharge hole (112); and side suction ports (213) communicating with both the space, as a vacuum chamber (V), and the through holes (113); and a coupling means (220) coupling the ejector assembly (100) and the housing (210) to each other.

8. The vacuum pump of claim 7, wherein the housing (210) is configured such that two or more parts (215, 216, and 217) including a main part (215) having the side suction ports (213) are closely disposed in a line, and a plurality of mutual locking means (218a and 218b) is formed on respective contact surfaces (S1 and S2) between the main part (215) and adjacent parts (216 and 217) so as to allow a rotation of the main part (215) relative to the adjacent parts (216 and 217) and thus allow a change in a direction of the side suction ports (213) of the main part (215).

9. The vacuum pump of claim 7, wherein the coupling means (220) is a snap ring (225) or nut, the snap ring (225) or nut being fitted over an outer circumference of a second ring-shaped protrusion (144) of the ejector assembly (100) protruding outside an end of the housing (210).

10. The vacuum pump of claim 8, wherein the coupling means (220) includes:

plates (221) making contact with opposite ends of the housing (210), respectively; and pressure rings (223) pressing the plates (221) and the main part (215) and the adjacent parts (216, and 217) by being fitted over the first and a second ring-shaped protrusion (124 and 144) passing through mounting holes (222) of the plates (221), respectively, so as to bring the plates (221) and the main part (215) and the adjacent parts (216, and 217) into close contact with each other.

11. The vacuum pump of claim 10, wherein each of the plates (221) has a plurality of insertion holes or insertion grooves that align with protrusions of each of the adjacent parts (216 and 217), the plurality of insertion holes or insertion grooves being formed on each of the plates (221) along an outer circumference of each of the mounting holes (222).

12. The vacuum pump of claim 10, wherein the plates (221) are utilized as brackets for fixing the vacuum pump (200).

* * * * *